United States Patent [19]

Konz

[11] 4,382,608
[45] May 10, 1983

[54] TOWABLE PAIRED TEAMS OF FARM IMPLEMENTS

[76] Inventor: Gerald J. Konz, R.R. #1 (Box 72), Minden, Iowa 51553

[21] Appl. No.: 277,152

[22] Filed: Jun. 25, 1981

[51] Int. Cl.³ .............................................. B60D 1/14
[52] U.S. Cl. ................................ 280/411 A; 172/313; 172/625
[58] Field of Search ........... 280/411 R, 411 A, 411 B, 280/411 C, 477; 172/310, 313, 625

[56] References Cited

U.S. PATENT DOCUMENTS

| 2,955,848 | 10/1960 | Hyland et al. | 280/411 C |
| 2,976,058 | 3/1961 | Sandgren | 280/413 |
| 3,112,124 | 11/1963 | Bartel | 172/625 X |
| 3,334,916 | 8/1967 | Tibbals | 280/412 |
| 3,419,284 | 12/1968 | Tibbals | 280/412 |
| 3,675,945 | 7/1972 | Fischer | 280/411 C |

*Primary Examiner*—John A. Pekar
*Attorney, Agent, or Firm*—George R. Nimmer

[57] ABSTRACT

Disclosed are towably paired teams of farm implements pivotably connected together at their central leadward-tongues to an intervening vehicular frame member which permits a tractor or other drayage vehicle to tow the farm implements together. During abreastly field position, the drayage vehicle tows the frame member from its medially positioned frame-tongue, there being removably secured bracing means, preferably comprising guidably automatically engageable struts and couplers, to maintain the two farm implements in finite-spacing parrallelism. During tandemly transport position, the drayage vehicle tows a primary one of the two farm implements from a central trailing-tongue, there being at the secondary implement removably extended bridging means, preferably comprising bridging coupler and lug combination, to the frame member to ensure that the secondary implement and the frame member will be joined in non-pivotal colinear relationship, and as a pivotably sequential addendum to the primary implement being towed from its trailing-tongue.

15 Claims, 5 Drawing Figures

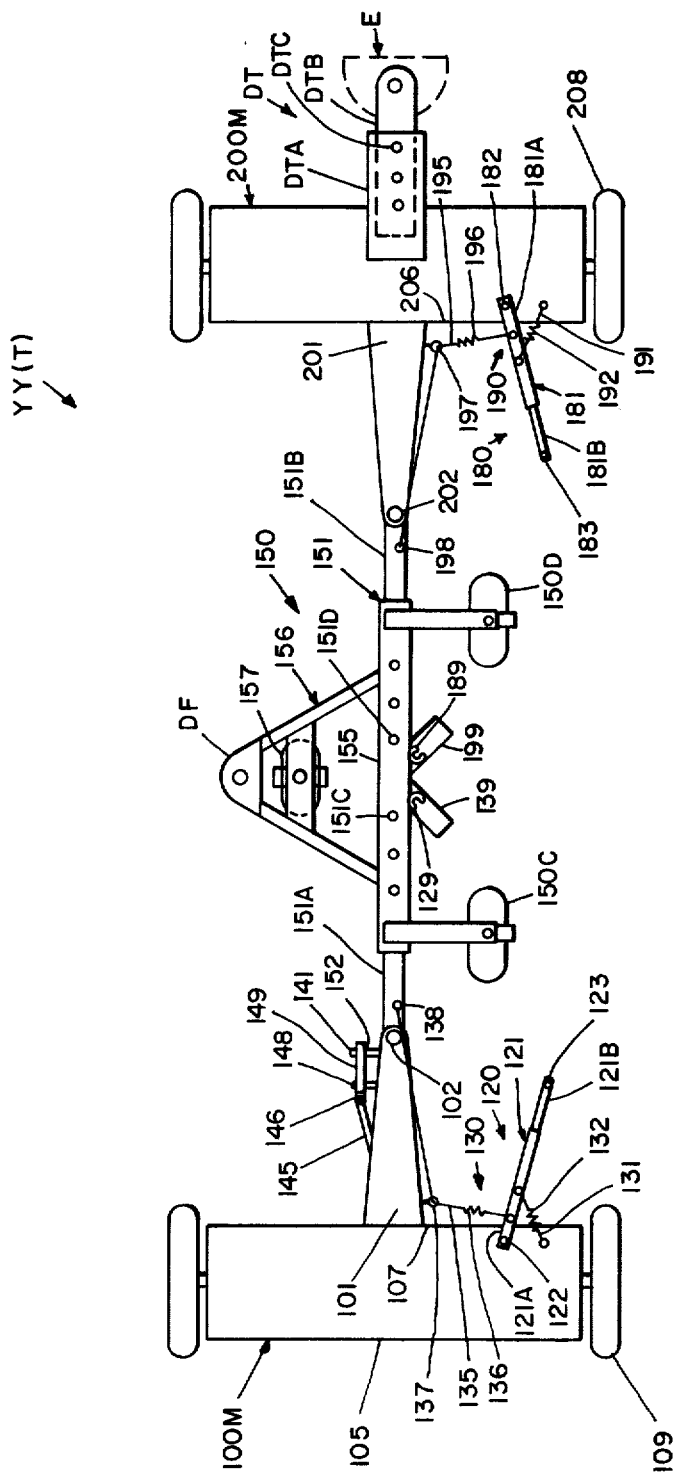

TOWABLE PAIRED TEAMS OF FARM IMPLEMENTS

Farm implements of various types, such as planters, grain-drills, cultivators, etc., commonly include a central leadward-tongue whereby a tractor or other drayage vehicle might tow the implement. In an effort to double the efficiency of any given farming operation, there has been the quest in the prior art to have a single tractor tow a pair of similar farm implements. During the farming operation, the paired farm implements need to be towed together in an abreastly field position wherein the implements should be maintained in finite-spacing parallelism. During transport of the paired implements team from one farming field to another, via narrow roadways, the implements are towed in tandemly transport position wherein the implements need to be maintained in towably governable processional sequence.

As exemplified by U.S. Pat. Nos. 2,976,058 and 3,522,860, recent prior art has deviced various schemes in the construction of intervening hitch frames designed to tow the paired implements in either abreast or tandem position. However, the prior art devices suffer from one or more of the following disadvantages and deficiencies. Some of the prior art hitch frames are quite complicated and costly to manufacture. Nearly all entail a considerable expenditure of time and effort in switching from one towing position to the other. Almost invariably, the tandem position lacks sufficient processional stability and maneuverability. Severe constraints exist in the prior art for accommodating various types and sizes of the farm implements to be paired for towing.

It is accordingly the general objective of the present invention to provide towable paired teams of farm implements which overcome the disadvantages and deficiencies of the prior art.

With such overall general objective in view, and in view of specific related objectives which will become more apparent as this description proceeds, the towably paired implement teams concept of the present invention generally comprises: each of the two farm implements at its central leadward-tongue being pivotably connected to an intervening novel frame member on opposite sides of the frame forward-tongue, the frame-tongue being engageable by the tractor or other drayage means during abreastly field position of the paired team; a pair of bracing means removably extending rearwardly of the frame member to the leftward-length and rightward-length of the respective implements to maintain them at finite-spacing parallelism during field position; radically departing from the prior art, one of the farm implements being provided with a central tandem-tongue extending trailwardly from its leadward-tongue, the tandem-tongue being engaged by the drayage means during transport position for the paired team and wherein such tandem-tongued primary implement faces and processionally precedes the sequentially following secondary implement; and, also radically departing from the prior art, removably extended bridging means to join the wheeled frame (additionally supported by an outrigger-wheel) and the secondary implement in colinear non-pivotal relationship whereby during transport position they maneuver as a single pivotal addendum to the primary implement being towed.

In the drawing, wherein like characters refer to like parts in the several views, and in which:

FIG. 3 is a top plan view showing the representative embodiment "YY" in the tandemly transport position "YY(T)";

Figure 1:
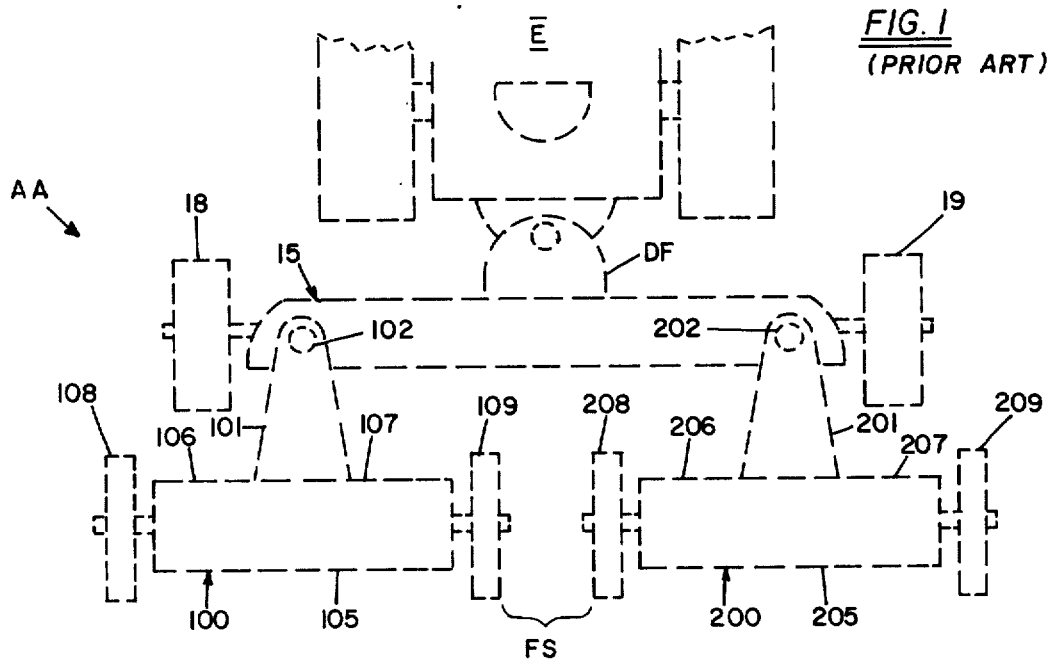
FIG. 1 is a top plan view showing a rudimentary prior art embodiment "AA" of a paired team of farm implements in a condition for towing both together in an abreastly field position.

Drawing FIG. 1 schematically depicts a rudimentary prior art form of a towably paired team of individually towable generic farm implements (100, 200) connected with an intervening frame member 15 having a forwardly extending frame-tongue "DF". Though the two farm implements are typically substantially identical so as to simultaneously perform the same farm operation, they are assigned different reference characters (100, 200) so as to provide consistency with FIGS. 2 and 3 wherein respective implements are provided with the tandem-tongue and the removably extending bridging means. First farm implement 100 of paired team "AA" includes a central leadward-tongue 101, a trailward-side 105, a leftward-length 106 extending from center 101 to leftend-tire 108, and a rightward-length 107 extending from center 101 to rightend-tire 109. Analagously, second farm implement 200 includes a central leadward-tongue 201, a trailward-side 205, a leftward-length 206 extending from center 201 to leftend-tire 208, and a rightward-length 207 extending from center 201 to rightend-tire 209. Though the respective farm implements 100 and 200 are individually towable from their leadward-tongues (101,201) by a suitable drayage means e.g. tractor "E", but when they are embodied into paired team "AA", the leadward-tongues are removably pivotably attached (e.g. via pivot-pins 102 and 202) to the intervening rollable (e.g. 18,19) frame member 15. In turn, the forward frame-tongue "DF" of frame member 15 is removably pivotably secured to the drayage means "E" to permit towing. During the FIG. 1 abreastly field position for parallel implements 100 and 200, it is necessary that a finite-spacing "FS" be maintained, which can be effected in various ways. Because the rudimentary frame member 15 of the prior art team "AA" makes no provision for a tandemly transport position of the farm implements 100 and 200, the implements need to be temporarily disassociated (102, 202) from the intervening frame member 15 and then individually towed (101, 201) by tractor "E" along the roadway route to another agricultural field.

Figure 2:
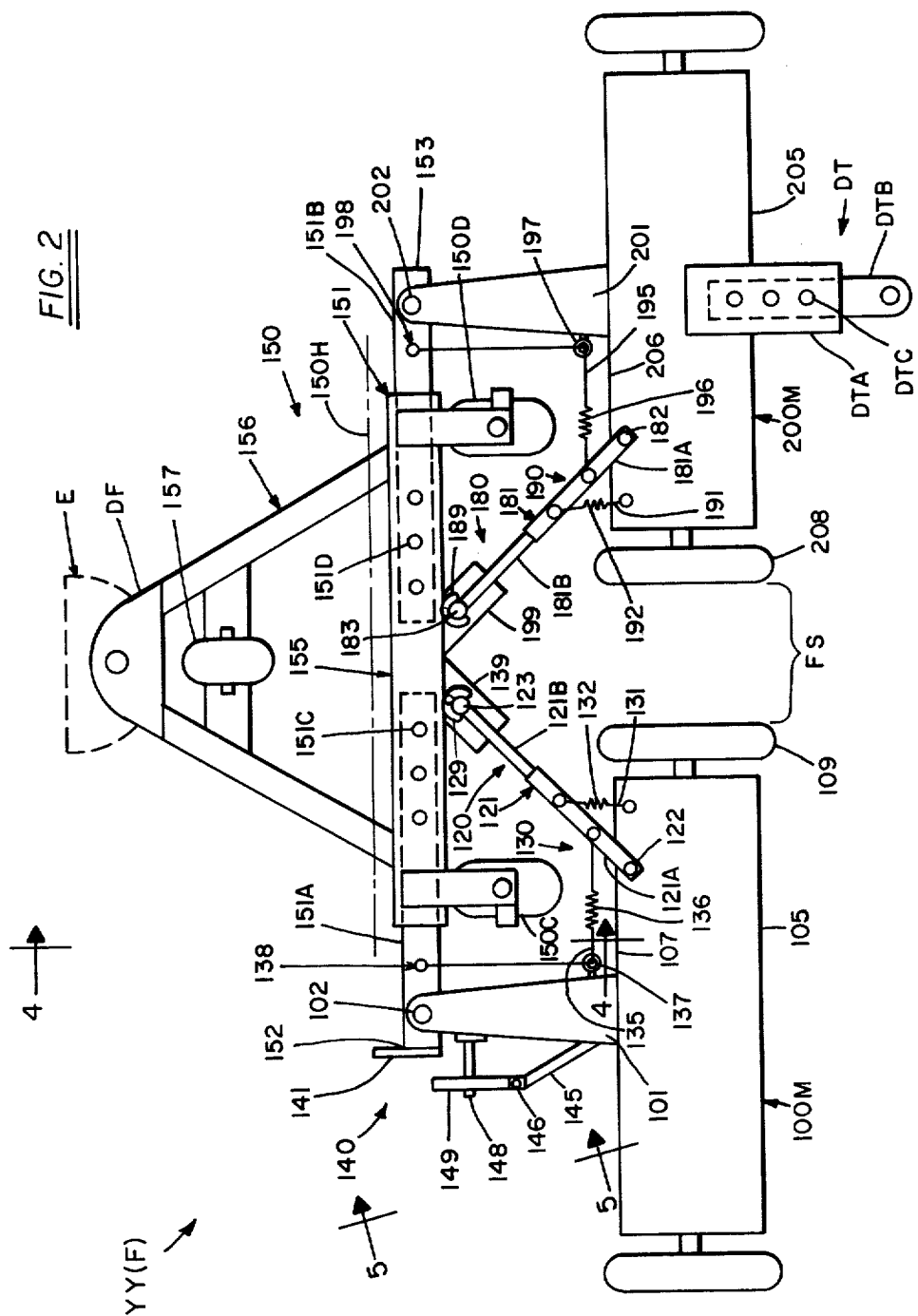
FIG. 2 is a top plan view showing a representative embodiment "YY" of the towably paired team of farm implements in the abreastly field position "YY(F)"

It is immediately apparent from drawing FIGS. 2 and 3 that the towably paired team embodiment "YY" of the present invention has the alternate capabilities for abreastly field position (e.g. "YY(F)" of FIG. 2) and for the tandemly transport position (e.g. "YY(T)" of FIG. 3) without the necessity for disassociating the farm implements from the intervening frame member (150). As will become clear as this description proceeds, the towably paired team concept "YY" includes several novel structural features not suggested by the prior art. However, even a cursory inspection of drawing FIG. 3 reveals that there is radical difference from the prior art during tandemly transport position "YY(T)". Specifically, the second farm implement 200 has been structurally modified into a "primary" implement 200M having a tandem or trailing tongue "DT" permitting it to be directly primarily towed by tractor "E" so its leading-tongue 201 faces the leading-tongue 101 of the processional sequential farm implement 100M. Moreover, first farm implement 100 has been structurally modified into a "secondary" implement 100M having its leading-tongue 101 equipped with a portion of a bridging means (140) removably extendable to the intervening frame member 150 so that secondary implement 100M and frame member 150 become colinearly locked so as to maneuver as a single pivotal addendum to the primary implement leadward-tongue e.g. at 202.

Intervening frame member 150 includes a horizontal frame-bar 151 extending parallel to frame-axis 150H from bar first-end 152 to bar second-end 153. Frame-bar 151 might comprise a plurality of telescopically associated and arrestable tubular members whereby the overall length between ends 152 and 153 might be selectively varied appropriate to the types and sizes of farm implements to be towed during abreastly field position. Herein, there is for frame-bar 151 a medial-length as segment 155, and two flanking segments 151A and 151B telescopically and arrestably (e.g. pin 151C) associated with segment 155. Frame-tongue "DF" extends forwardly from the frame-bar medial-length 155, preferably remotely of bar 151 at the forward apex of triangular framework 156. The first and second implements at their leadward-tongues are respectively pivotably connected (e.g. 102, 202) to frame-bar segments 151A and 151B. Thus, as seen in FIG. 2, frame-bar 151 assumes a transverse relation to the towing direction when the implements are in abreastly field position "YY(F)". And as seen in FIG. 3, frame-bar 151 and axis 150H assume a parallel relation to the towing direction when the implements are in tandemly transport position "YY(T)".

Triangular framework (156) for frame-tongue "DF" converges forwardly from and is rigidly attached to frame-bar medial-length 155. Framework 156 forwardly of frame-bar 151 carries a dual-elevational and multi-directional outrigger-wheel 157 employable in ground engaging lowered elevation during transport position "YY(T)" and employable raised above ground during field position "YY(F)". Frame member 150 also includes a pair of permanently lowered wheels 150C and 150D extending rearwardly from frame-bar 151, said wheels 150C and 150D flanking bar medial-length 155 and being multi-directional so as to follow all towing directions for paired team "YY".

There are field position determining means comprising a pair of removably extended bracing means (e.g. 120, 180) to maintain implements 100M and 200M at said finite-spacing "FS". The respective bracing means 120 and 180 extend rearwardly from frame-bar medial-length 155 to the respective implements remote of their leadward-tongues (101, 201). Bracing means 120 and 180, which are preferably identically structured, are desireably of the removably secured struts and couplers type. For example, bracing means 120 comprises an elongate first-strut 121 pivotably attached at 122 to rightward-length 107 of first implement 100M and having strut free-end 123 extendable into left-coupler 129 attached to the leftward side of frame-bar medial-length 155. Analagously, bracing means 180 comprises an elongate second-strut 181 pivotably attached at 182 to leftward-length 206 of second implement 200M and having its free-end 183 extendable into right-coupler 189 attached to the rightward side of said medial-length 155. The respective elongate struts 121 and 181 might be as telescopically associated and arrestable segments (e.g. 121A-121B and 181A-181B) to accommodate the distance between frame member 150 and the implements 100M and 200M.

Figure 4:
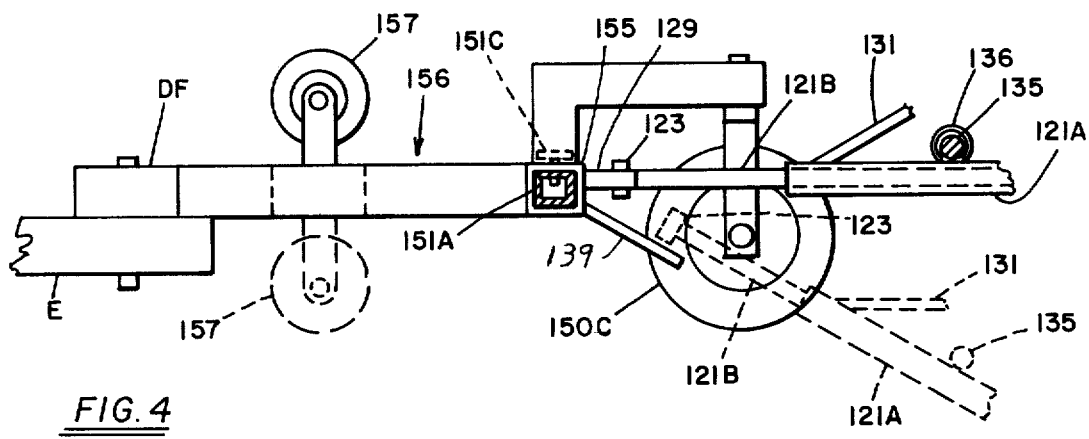
FIG. 4 is a sectional elevational view taken along line 4—4 of FIG. 2 showing the bracing means and ancillary guiding means.

The left and right couplers are preferably automatically engageable with the respective struts free-ends (123,183) when physical contact is made therebetween. For example, the couplers might be as conventional spring-loaded claws (129, 189) to fit around bulbous free-ends (123,183). In this vein, it is desireable to have guiding means to guide the respective struts free-ends into physical contact with the couplers whenever the drayage vehicle (E) pulls upon frame-tongue "DF" to initiate field position "YY(F)". Preferably, the respective guiding means takes the forms 130 and 190, each including a ramp means (139, 199) attached to and extending rearwardly from frame-bar 155 so as to underlie the respective couplers (129, 189). Also, guiding means 130 and 190 each include strut steadying means having vertical (131, 191) and lateral (135, 195) force vectors which together have the cooperate result of aiming the struts free-ends (123, 183) toward the respective ramp means (139,199). The respective vertical force vectors might comprise vertically extending chains (131, 191) extending upwardly from strut parts (121A, 181A) to upward extensions of adjacent implement lengths (107, 206), preferably including resilient springs (132, 192) therealong to compensate for implements rocking. The respective lateral force vectors might comprise generally horizontal chains (135, 195) having one end attached to the struts (121A, 181A), thence passing along and being slidably surrounded at its leadward-tongue (e.g. at eyebolt lateral extensions 137, 197), and having its other end (138, 198) attached to frame-bar 151 adjacent pivotal connections 102 and 202. The respective lateral force vectors preferably include resilient springs (136, 196) therealong tending to draw the struts (121, 181) directionally towards leadward-tongues 101 and 201 when the implements are in transport position "YY(T)". In FIG. 4, phantom lines indicate relinquishing of transport position, while solid lines indicate the attainment of field position "YY(F)".

Turning now to the determining of transport position "YY(T)", initiatable when the tandem-tongue "DT" is being towed by "E", and the bridging means (140) is removably engaged. During transport position, elongate struts 121 and 181 should not be permitted to dangle downwardly onto the ground nor should they be permitted to increase the overall width of the implements 100M and 200M. Accordingly, and as previously alluded to, the vertical force vectors (131-132, 191-192) and the lateral force vectors (135-138, 195-198) are advantageously employed. The term "primary" implement means whichever of the two implements (100, 200) is arbitrarily selected for installation of a trailing-tongue "DT"; herein second implement 200 serves as "primary" implement 200M. The term "secondary" implement meanswhichever of the two farm implements is arbitrarily selected for installation of a bridging means (e.g. 140); herein, first implement serves as "secondary" implement 100M.

Central tandem-tongue "DT" is attached to the primary implement and extends horizontally trailwardly from its leadward-tongue and trailwardly beyond its trailward side (e.g. 205). Tandem-tongue "DT" might include a plurality of telescopically associated and arrestable (e.g. pin "DTC") segments "DTA" and "DTB", the former being rigidly attached to the primary implement (e.g. 200M) and the latter segment be engageable by the drayage means "E".

Figure 5:
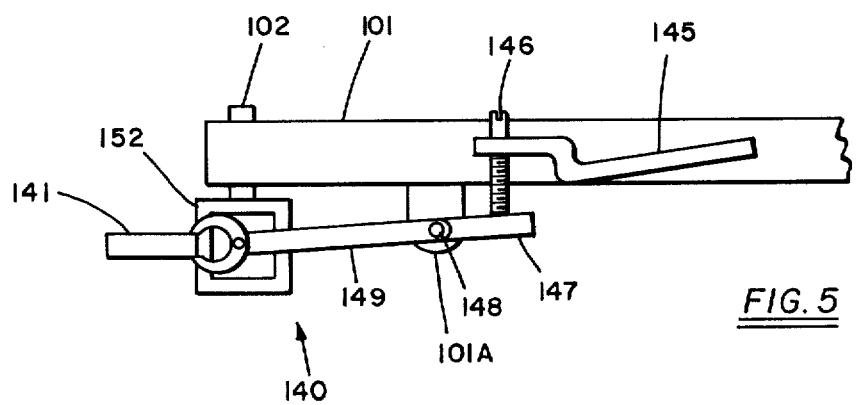
FIG. 5 is a sectional elevational view taken along line 5—5 of FIG. 2 showing the bridging means.

As previously alluded to, the bridging means (e.g. 140) is removably extendable between the leadward-tongue of the secondary implement (e.g. 101 of 100M) to an endward location (e.g. 152) of the frame member, and is sufficiently rigid at engagement to ensure a non-pivotal colinear relationship between the secondary implement and the frame member (150). The bridging means preferably comprises automatically and removably engageable components including bridge-coupler (e.g. 149) and bridge-lug (e.g. 141); one component is attached to a terminus of the frame-bar and the other component is attached to the secondary implement leadward-tongue trailwardly adjacent its pivotal connection (e.g. 102) to the frame-bar. In drawing FIGS. 3 and 5, bridge-lug component 141 is shown rigidly attached to and extending forwardly of frame-bar end 152, and bridge-coupler component 149 is shown pivotably attached at 148 to leadward-tongue 101. Moreover, bridge-coupler 149 is vertically adjustable, as by threaded screw 146 bearing downwardly upon coupler extension 147, to empirically ensure automatic engagement between components 141 and 149 whenever the drayage means "E" is pulling upon tandem-tongue "DT". In this vein, bridge-coupler 149 might be of analagous construction to couplers 129 and 189. When it is desired to terminate transport position "YY(T)", the tractor operator manually releases bridge-coupler 149, resets couplers 129 and 189 to receive struts 121 and 181, and re-hitches the tractor to frame-tongue "DF", whereby drayage therefrom eventually causes resumption of field position "YY(F)".

From the foregoing, the construction and operation of the towable paired teams of farm implements will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A paired team of first and second farm implements connected through an intervening frame member in a condition permitting a drayage vehicle to tow said two farm implements in an abreastly field or a tandemly transport position, said first and second implements respectively having a central leadward-tongue, a trailward-side, and a leftward-length and a rightward-length positioned on opposite sides of the leadward-tongue, said towable implements team comprising:

A. for the frame member:
   ai. a frame-axis parallel to an elongate frame-bar component of the frame member, said frame-axis assuming a transverse relationship with respect to the towing direction when said implements are in abreastly field position and assuming a parallel relationship to the towing direction when said implements are in tandemly transport position,
   aii. said frame-bar having a medial-length located intermediate a first-end and a second-end of said frame-bar, the first and second implements at their leadward-tongue being pivotally connected to the frame-bar on opposite sides of the medial-length,
   aiii. a frame-tongue located forwardly from and attached to the frame-bar and being adapted to engage the drayage vehicle during field position,
   aiv. a pair of permanently lowered wheels extending rearwardly from the frame-bar, said wheels flanking the frame-tongue and being multi-directional so as to follow every selected towing direction initiated by the drayage vehicle, and
   av. a dual-elevational and multi-directional outrigger-wheel located rearwardly of and attached to the frame-tongue, said outrigger-wheel being employed in ground engaging elevation when the implements are being towed in transport position and being employed above ground when the implements are being towed in field position;

B. field position determining means, initiatable when the drayage vehicle pulls upon the frame-tongue, comprising a pair of removably secured bracing means to maintain the implements in finite-spacing parallelism, one of said bracing means removably extending from the frame-bar to the leftward-length of one implement and the other side bracing means removably extending from the frame-bar to the rightward-length of the other implement; and C. transport position determining means, initiatable when the drayage vehicle pulls upon a tandem-tongue, comprising:
   ci. for a primary of the two implements, a central tandem-tongue extending trailwardly from its leadward-tongue and trailwardly beyond said implement trailward-side, and
   cii. for the secondary of the two implements, a bridging means removably extendable from its leadward-tongue to an endward location of the frame-bar, said bridging means being sufficiently rigid and of appropriate location to ensure a non-pivotal collinear relationship between the secondary implement and the frame-bar.

2. The paired implements team of claim 1 wherein the removably extending bracing means comprises a pair of couplers extending rearwardly from the frame-bar medial-length and including a left-coupler and a right-coupler, and further comprises a pair of generally horizontal struts including a first-strut extending pivotally leadwardly from the first implement and having a free-end removably engageable with the left-coupler, and further including a second-strut extending pivotally leadwardly from the second implement and having a free-end removably engageable with the right-coupler.

3. The paired implements team of claim 2 wherein the left-coupler and the right-coupler are automatically engageable with the respective struts free-ends when physical contact is made with the couplers; and wherein there are guiding means to guide the respective struts free-ends into physical contact with the couplers whenever the drayage vehicle pulls upon the frame-tongue to initiate field position.

4. The paired implements team of claim 3 wherein the respective guiding means comprises: ramp means attached to and extending rearwardly from the frame-bar so as to underlie the first-coupler and the second-coupler, and strut steadying means having vertical and lateral force vectors which together have the cooperative result of aiming the respective struts free-ends toward the respective ramp means portion of the guiding means.

5. The paired implements team of claim 4 wherein the strut steadying means portion of the guiding means includes resiliency along the vertical force vector tending to compensate for implement rocking and further includes resiliency along the lateral force vector tending to draw the strut toward its implement's leadward-tongue.

6. The paired implements team of claim 5 wherein the lateral force vector of the strut steadying means is slidably surrounded at the implement leadward-tongue and thence is finally connected to the frame-bar whereby as the implement leadward-tongue pivots at the frame-bar and approaching transport position, the strut is drawn directionally toward said leadward-tongue.

7. The paired implements team of claim 1 wherein the bridging means comprises the combination of automatically and removably engageable components including a bridge-coupler and a bridge-lug, one of said components being attached to an endward location of the frame-bar and spaced leadwardly from the secondary implement leadward-tongue, and the other component being attached to the secondary implement leadward-tongue trailwardly adjacent its pivotal connection to the frame-bar.

8. The paired implements team of claim 7 wherein the bridge-coupler is attached in vertically adjustable and pivotal relationships to the leadward-tongue, said bridge-coupler pivot axis being trailwardly adjacent the leadward-tongue pivotal connection to the frame-bar, the bridge-lug being attached to the end of the frame-bar.

9. The paired implements team of claim 1 wherein the tandem-tongue, the bracing means, and the frame-bar are of selectively variable lengths.

10. The paired implements team of claim 2 wherein the tandem-tongue, the first-strut and the second-strut, and the frame-bar are of selectively variable and arrestable lengths.

11. The paired implements team of claim 3 wherein the bridging means comprises the combination of automatically and removably engageable components including bridge-coupler and bridge-lug, one of said components being attached to an endward location of the frame-bar and the other components being attached to the secondary implement leadward-tongue.

12. The paired implements team of claim 11 wherein the bridge-lug is attached to the end of the frame-bar and wherein the bridge-coupler is attached in vertically adjustable and pivotal relationships to the leadward-tongue.

13. For a paired team of first and second farm implements connected through an intervening frame member in a condition permitting a drayage vehicle to two said two farm implements in an abreastly field or a tandemly transport condition, said first and second farm implements respectively having a central leadward-tongue, a trailward-side, and leftward-length and rightward-length positioned on opposite sides of the leadward-tongue, said intervening frame member comprising:
   A. an elongate frame-bar extending parallel to a frame-axis, said frame-bar having a medial-length located intermediate a first-end and a second-end of said frame-bar, the first and second implements at their leadward-tongue being pivotally connectable to the frame-bar on opposite sides of the medial-length;
   B. a frame-tongue located forwardly from and attached to the frame-bar and being adapted to engage the drayage vehicle during field position;
   C. a pair of couplers extending rearwardly from the frame-bar medial-length and including a left-coupler and a right-coupler;
   D. ramp means attached to and extending rearwardly from the frame-bar so as to underlie the first-coupler and the second-coupler;
   E. a pair of permanently lowered wheels extending rearwardly from the frame-bar, said wheels flanking the frame-tongue and being multi-directional so as to follow every selected towing direction initiated by the drayage vehicle; and
   F. a dual-elevational and multi-directional outrigger-wheel located rearwardly of and attached to the frame-tongue, said outrigger-wheel being employable in ground engaging elevation when the implements are being towed in transport position and being employable above ground when the implements are being towed in field position.

14. The frame member of claim 13 wherein the frame-bar is of selectively variable and arrestable length.

15. The frame member of claim 14 wherein there is a bridge-lug attached to one of the two ends of the frame-bar.

* * * * *